United States Patent [19]

Plummer

[11] Patent Number: 5,283,920
[45] Date of Patent: Feb. 8, 1994

[54] FISHING HOOK TOOL

[76] Inventor: Harold H. Plummer, R. 1, Box 206F, Marshall, Mo. 65340

[21] Appl. No.: 999,275

[22] Filed: Dec. 31, 1992

[51] Int. Cl.⁵ .............................................. B25F 1/04
[52] U.S. Cl. ........................................... 7/106; 7/118; 7/120; 43/4
[58] Field of Search ............... 43/4; 7/106, 118, 120, 7/119, 158, 167, 168, 170

[56] References Cited

U.S. PATENT DOCUMENTS

| D. 231,454 | 4/1974 | Bloch | 43/4 |
| 927,532 | 7/1909 | Heissenberger | 7/120 |
| 3,825,961 | 7/1974 | Klein | 7/106 |
| 4,856,132 | 8/1989 | Burns | 7/118 |
| 5,136,744 | 8/1992 | Allsop | 43/4 |

FOREIGN PATENT DOCUMENTS 304906  4/1918  Fed. Rep. of Germany .......... 7/118

Primary Examiner—Kurt C. Rowan
Attorney, Agent, or Firm—Leon Gilden

[57] ABSTRACT

A tool structure includes a plurality of first blade members, each having a conical file arranged for cleaning of hooks and the like, with a plurality of second blades, each having a spring loop tool structure to direct fishing line through an associated fishing hook loop and the like.

5 Claims, 4 Drawing Sheets

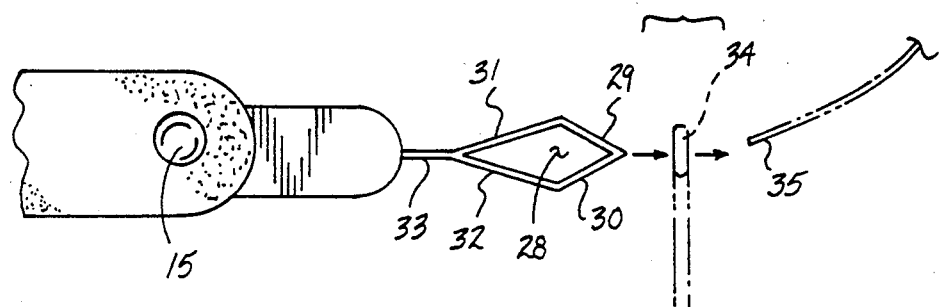
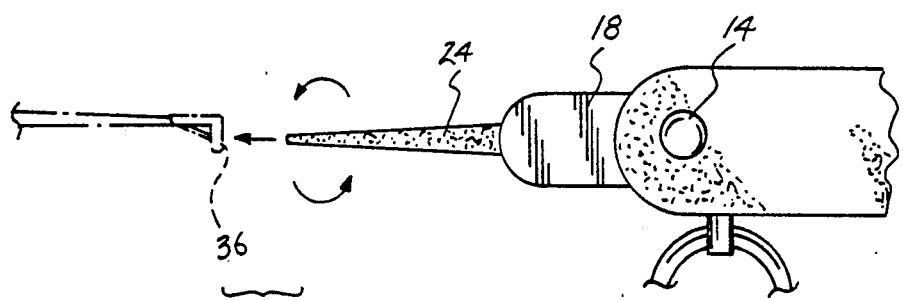

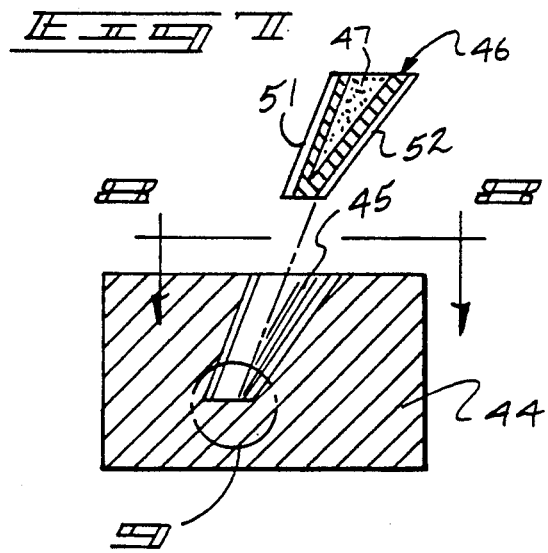
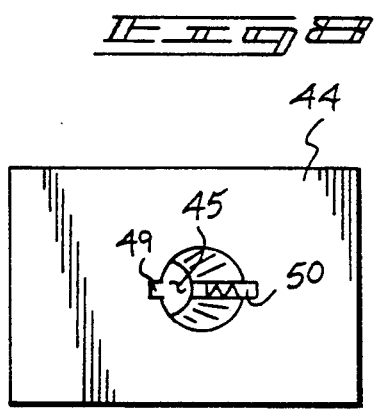
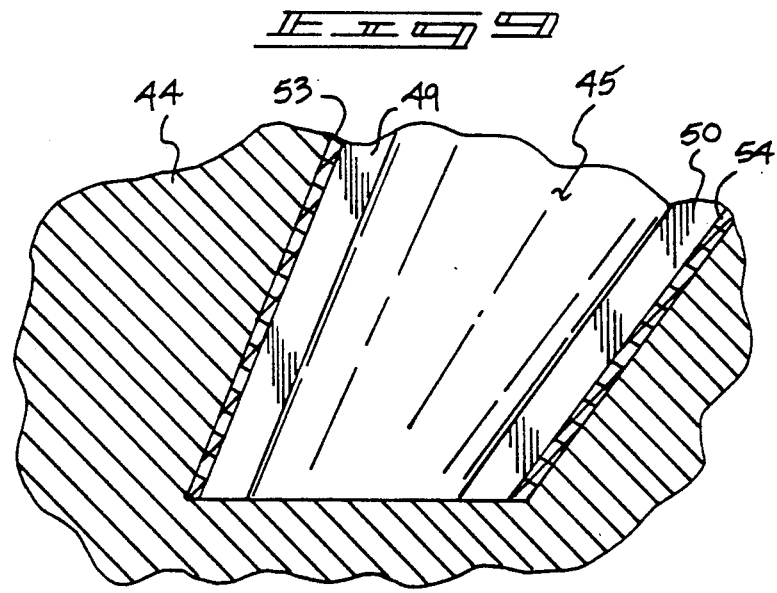

1

FISHING HOOK TOOL

BACKGROUND OF THE INVENTION

1. Field of the Invention

The field of invention relates to tool apparatus, and more particularly pertains to a new and improved fishing hook tool arranged to accommodate cleaning and directing of fishing line through various fishing eyelet structure, such as fishing hooks and fishing rod loops.

2. Description of the Prior Art

Fishing accessory tool structure is available in the prior art, wherein such accessory structure has heretofore failed to assist fishermen in the threading and cleaning of eyelet structure relative to a fishing procedure. The instant invention attempts to overcome deficiencies of the prior art by providing for various conical files arranged to permit the cleaning of eyelets associated with fishing equipment, wherein spring loop structure is arranged to secure a fishing line to permit its projection through such eyelet structure and in this respect, the present invention substantially fulfills this need.

SUMMARY OF THE INVENTION

In view of the foregoing disadvantages inherent in the known types of fishing tool accessory apparatus now present in the prior art, the present invention provides a fishing hook tool wherein the same is arranged to permit the cleaning and directing of fishing line relative to fishing equipment. As such, the general purpose of the present invention, which will be described subsequently in greater detail, is to provide a new and improved fishing hook tool which has all the advantages of the prior art fishing tool apparatus and none of the disadvantages.

To attain this, the present invention provides a tool structure including a plurality of first blade members, each having a conical file arranged for cleaning of hooks and the like, with a plurality of second blades, each having a spring loop tool structure to direct fishing line through an associated fishing hook loop and the like.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing hook tool which has all the advantages of the prior art fishing tool apparatus and none of the disadvantages.

It is another object of the present invention to provide a new and improved fishing hook tool which may be easily and efficiently manufactured and marketed.

It is a further object of the present invention to provide a new and improved fishing hook tool which is of a durable and reliable construction.

An even further object of the present invention is to provide a new and improved fishing hook tool which is susceptible of a low cost of manufacture with regard to both materials and labor, and which accordingly is then susceptible of low prices of sale to the consuming public, thereby making such fishing hook tools economically available to the buying public.

Still yet another object of the present invention is to provide a new and improved fishing hook tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view of the spring loop structure in use.

FIG. 4 is an orthographic view of the conical file structure in use.

FIG. 7 is an enlarged orthographic view of the fishing hook sharpening structure.

FIG. 8 is an orthographic view, taken along the lines 8—8 of FIG. 7 in the direction indicated by the arrows.

FIG. 9 is an enlarged orthographic view of section 9 as set forth in FIG. 7.

DESCRIPTION OF THE PREFERRED EMBODIMENT

Figure 1:
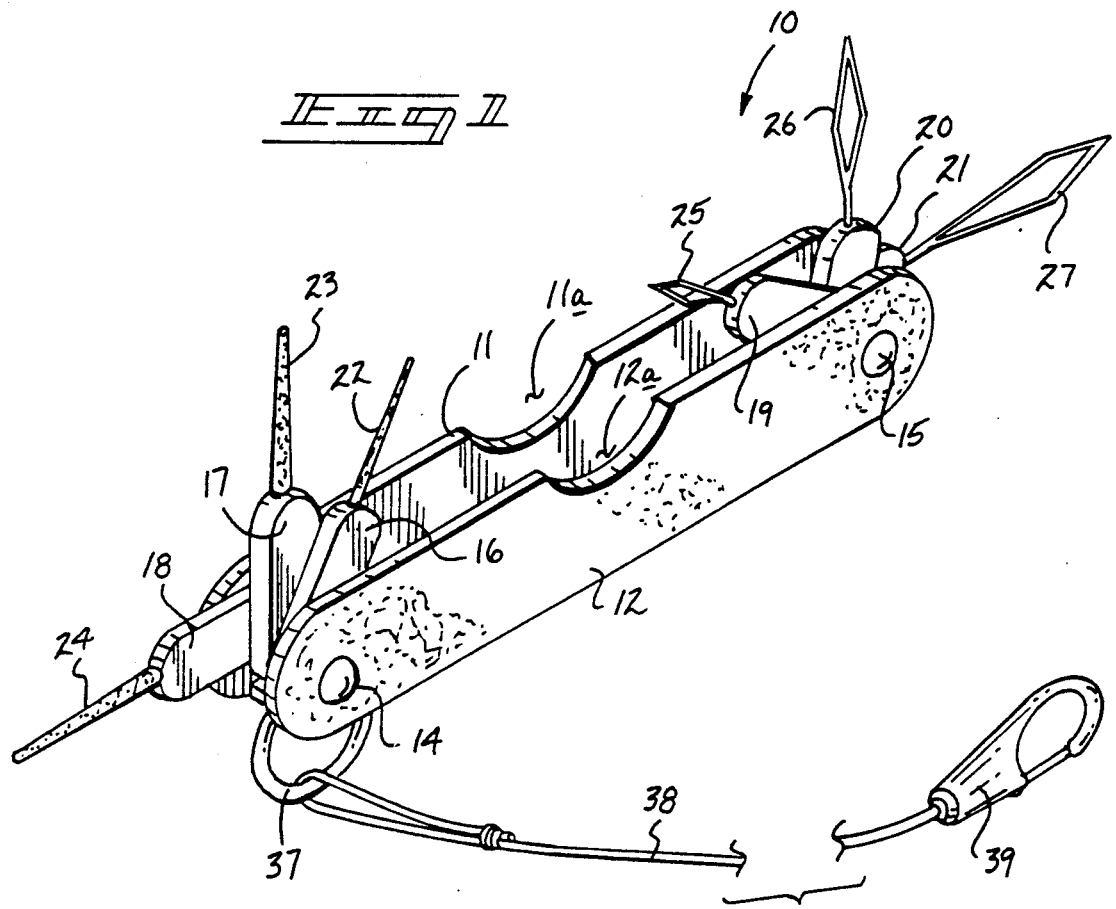
FIG. 1 is an isometric illustration of the invention.
Figure 2:
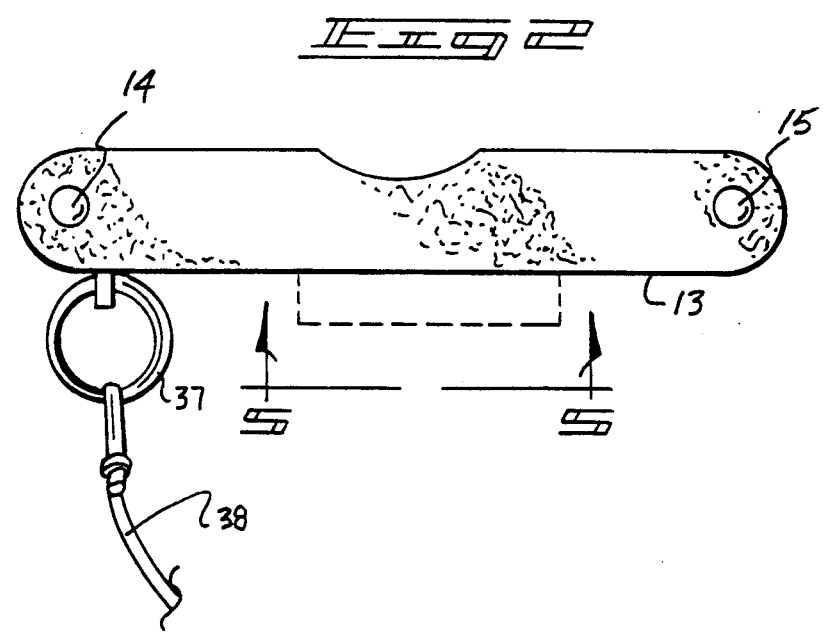
FIG. 2 is an orthographic side view of the invention.

With reference now to the drawings, and in particular to FIGS. 1 to 9 thereof, a new and improved fishing hook tool embodying the principles and concepts of the present invention and generally designated by the reference numeral 10 will be described.

More specifically, the fishing hook tool 10 of the instant invention essentially comprises a first side wall 11 spaced from a second side wall 12, having respective first and second side wall top edge recesses 11a and 12a arranged in an aligned relationship to ease access to the various tool components positioned therebetween. To this end, respective first and second axles 14 and 15 are arranged parallel relative to one another and positioned at opposed ends of the first and second side walls 11 and 12 directed therethrough, with first, second, and third blade plates 16, 17, and 18 pivotally mounted about the first axle 14, with third, fourth, and fifth blade plates 18, 19, and 20 respectively directed pivotally about the second axle 15. Respective first, second, and third conical files 22, 23, and 24 are mounted to respective first, second, and third blade plates respectively, with each conical file arranged for the cleaning and deburring of fish hook eyes 34, as well as fishing pole eyelet loops 36. First, second, and third spring loops 25, 26, and 27 are arranged to be directed through fishing pole eyelets 36, as well as fishing hook eyes 34 and are compressible and arranged to secure a fishing line 35 within each spring loop opening 28 of each of the first, second, and third spring loops 25, 26, and 27. Each of the loop openings 28 are formed of intersecting first and second legs 29 and 30 intersecting one another at a first intersection defining an acute angle therebetween, wherein the first intersection is arranged to permit securement of the fishing line 35. As the loop opening 28 is compressible when directed through associated fishing hook eye 34, the securement of the fishing line is insured when directed through an associated fishing hook eye 34 and the like. Third and fourth legs 31 and 32, also formed of spring-biased construction, are mounted to the respective first and second legs 29 and 30, with the third and fourth legs 31 and 32 intersecting one another at a second intersection, with the second intersection secure to a support rod 33, that in turn is mounted to an associated blade plate 19, 20, or 21, in a manner as indicated in FIG. 1.

For convenience in transport of the organization and a securement to an individual's belt and the like, a ring member 37 is pivotally mounted to the floor plate 13 of the tool structure, with a tether line 38 secured to the ring member 37, and a fastener loop 39 secured to the tether line to permit its fastening about an individual's belt, belt hook loop, and the like.

Figure 5:
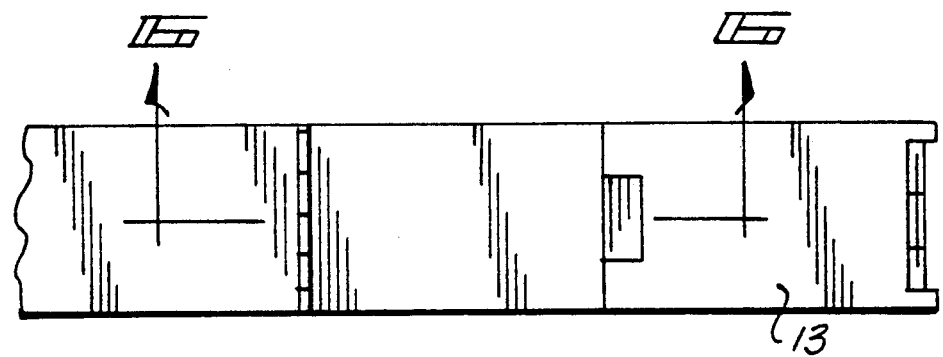
FIG. 5 is an orthographic view, taken along the lines 5—5 of FIG. 2 in the direction indicated by the arrows.
Figure 6:
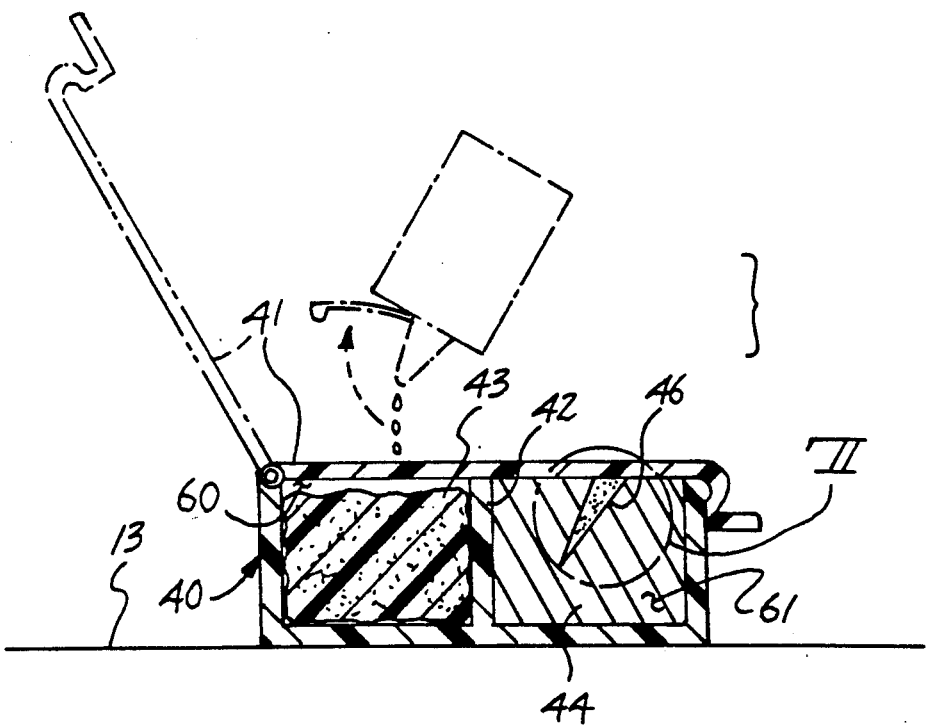
FIG. 6 is an orthographic view, taken along the lines 6—6 of FIG. 5 in the direction indicated by the arrows.

The FIG. 5 indicates the use of optional housing 40 mounted to the floor plate 13, with a housing lid 41 hingedly mounted to the housing 40 to permit access interiorly of the housing 40, that by means of a partition wall 42 is divided into a first and second chamber 60 and 61 respectively, with the first chamber having a lubricant saturated sponge member 43 saturated with a lubricant "L", with the second chamber having a rigid filler block 44 positioned therewithin. The rigid filler block 44 includes a conical cavity 45 that includes a removable hook sharpening insert 46. Each insert 46 includes an abrasive conical insert wall 47 for the sharpening of a hook member to be inserted therewithin and subsequently rotated during a sharpening procedure. The insert 46 includes first and second ferrous ribs 51 and 52 mounted to an exterior surface of the insert, with the inserts arranged for reception within respective first and second grooves 49 and 50 that are arranged in communication with the conical cavity 45 to receive the respective first and second ribs 51 and 52. Each of the first and second grooves 49 and 50 (see FIG. 9) includes a first and second respective groove magnetic liner wall 53 and 54 for the adherence of the respective ribs 51 and 52 to secure the inserts 46 that may be provided of varying sizes to sharpen variously sized hooks.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing hook tool, comprising,
   a first side wall spaced from a second side wall, and a floor plate extending between the first side wall and the second side wall, wherein a first axle is orthogonally directed through the first side wall and the second side wall, and a second axle spaced from and parallel the first axle is directed through the first side wall and the second side wall, wherein the first axle and the second axle are spaced apart a predetermined spacing, with a plurality of blade plates mounted to the first axle, and a plurality of further blade plates mounted to the second axle, wherein each of the blade plates includes a conical file member fixedly mounted to each of the blade plates, and
   a spring loop member mounted to each of the further blade plates, wherein the file member includes an abrasive exterior surface for cleaning a fish hook eyelet, and the spring loop includes a spring loop opening for receiving a fishing line for directing the fishing line and pulling said fishing line through said eyelet.

2. A fishing hook tool as set forth in claim 1 wherein the spring loop includes a first leg and a second leg joined at a first intersection, and a third leg secured to the first leg and defining an obtuse angle therebetween, and a fourth leg joined to the second leg defining said obtuse angle therebetween, and the third leg and the fourth leg are joined at a second intersection, and a support rod, the support rod is secured to said further blade plate, and the first leg and the second leg are arranged in a spring-biased projection towards one another to receive said fishing line therebetween permitting deformation of said spring loop opening upon deformation of said spring loop to permit directing said spring loop through said eyelet.

3. A fishing hook tool as set forth in claim 2 including a housing mounted to the floor plate, the housing including a housing lid hingedly mounted to the housing, and the housing having a first chamber and a second chamber, with a partition wall directed through the housing dividing the first chamber relative to the second chamber, the first chamber having a lubricant saturated sponge member therein for the lubrication of fishing line for permitting its ease of directing through said eyelet, and the second chamber having a rigid filler block therewithin, the rigid filler block having a hook sharpening insert therein.

4. A fishing hook tool as set forth in claim 3 wherein the rigid filler block includes a conical cavity, the conical cavity having spaced first and second grooves, and the insert having an abrasive insert conical wall, and the insert further including a first rib spaced from a second rib received within the respective first groove and the second groove.

5. A fishing hook tool as set forth in claim 4 wherein the first groove includes a first groove magnetic liner wall, and the second groove includes a second groove magnetic liner wall, the first rib formed of a ferrous material and the second rib formed of a ferrous material for magnetic adherence within the first groove and the second groove to secure said insert within the conical cavity.

* * * * *